United States Patent Office 3,546,177
Patented Dec. 8, 1970

1

3,546,177
POLYESTERS CONTAINING STERICALLY
HINDERED TRIALKYL PHOSPHATES
Charles J. Kibler and Frederick W. Voigt, Jr., Kingsport,
Tenn., assignors to Eastman Kodak Company, Rochester, N.Y., a corporation of New Jersey
No Drawing. Filed Mar. 7, 1968, Ser. No. 711,193
Int. Cl. C08g 17/133
U.S. Cl. 260—75                                          10 Claims

ABSTRACT OF THE DISCLOSURE

Highly polymeric, linear polyesters, such as polyethylene terephthalate, which contain sterically hindered trialkyl phosphates have good thermal stability and good color characteristics.

This invention relates to highly polmeric, linear polyesters which contain sterically hindered trialkyl phosphates. This invention also relates to a process for preparing such polyesters.

The production of fiber- and film-forming polyesters is described in U.S. Pat. 2,465,319. These polyesters, and in particular polyethylene terephthalate, have attracted high commercial interest. They are usually prepared by carrying out an ester interchange reaction followed by a polymerization reaction at elevated temperature and reduced pressure. Several catalysts have been proposed for both of these reactions.

In the ester interchange reaction, ethylene glycol and dimethyl terephthalate are the usual starting materials when preparing polyethylene terephthalate. Examples of catalytic materials which have been proposed for use in this reaction include alkali metals (such as sodium, potassium, and lithium); alkaline earth metals (such as calcium, barium, strontium, and magnesium); and transition metals (such as manganese, cobalt, zinc, lanthanum, and cadmium). Of course, various derivatives of these metals (such as the hydrides, oxides, and acetates) may also be used. In some cases, the catalyst may be removed from the glycol terephthalate monomer; for example, a volatile amine may be used as the catalyst and distilled from the reaction mixture after the monomer is formed. However, the usual practice is to allow the ester exchange catalyst to remain, since in the case of a non-volatile catalyst it is usually difficult to remove.

The ester interchange catalyst is usually not a very effective polymerization catalyst, and it is customary to utilize a specific catalyst for polymerization. Of these, antimony, gallium, and compounds thereof (such as antimony trioxide, antimony triacetate, and gallium trioxide) are suitable owing to their high catalytic effect and low tendency towards the production of color.

Although polymers having good color characteristics (i.e., relatively low color) are produced by using antimony compounds as polymerization catalysts, it is desired to reduce still further the color of the polymer, especially when the polymer is intended for preparation of substantially colorless or white textile fibers. Unfortunately, the ester interchange catalyst may tend to increase the amount of color which develops during the polymerization reaction, the extent of color formation being dependent on the particular nature of the catalyst.

It is an object of this invention to provide highly polymeric, linear polyesters having good thermal stability and good color characteristics. It is a further object of this invention to provide a process for preparing such polyesters. It is another object of this invention to provide a process for preparing such polyesters wherein the rate of ester interchange is improved. Other objects of this invention will appear herein.

These and other objects are attained through the practice of this invention, at least one embodiment of which provides a highly polymeric, linear polyester derived from (A) a difunctional dicarboxylic acid and (B) ethylene glycol, said polyester containing from about 10 to about 100 parts per million, calculated as phosphorus and based on the weight of the polyester, of a sterically hindered trialkyl phosphate having the formula:

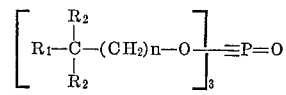

wherein $R_1$ is an alkyl group of 4 to 18 carbon atoms, $R_2$ is an alkyl group of 1 to 4 carbon atoms, and $n$ is 0 or 1.

Another embodiment of this invention provides an improved process for preparing highly polymeric, linear polyesters, wherein said process comprises (1) reacting (A) a difunctional dicarboxylic acid and (B) ethylene glycol and (2) polymerizing the ester thus produced, and wherein said improvement comprises effecting said reaction (1) in the presence of the above-described sterically hindered trialkyl phosphates.

The sterically hindered alkyl phosphates that can be utilized according to the invention are trialkyl phosphates, each alkyl group of which is branched sufficiently to hinder the phosphate ester. The preferred trialkyl phosphates have the formula:

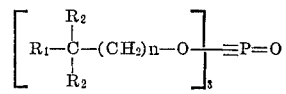

wherein $R_1$ is an alkyl group of 4 to 18 carbon atoms (such as n-butyl, i-butyl, t-butyl, n-pentyl, n-hexyl, n-octyl, n-decyl, n-dodecyl, and n-tetradecyl), $R_2$ is an alkyl group of 1 to 4 carbon atoms (such as methyl, ethyl, i-propyl, n-propyl, n-butyl, i-butyl, and t-butyl), and $n$ is 0 or 1.

The preferred phosphates are tris(2,2,4-trimethylpentyl)phosphate and tris(2,2-dimethyloctyl)phosphate.

Good results are obtained when from about 10 to about 100 parts per million (p.p.m.), calculated as phosphorus and based on the weight of the polyester, of the sterically hindered trialkyl phosphate is used. Especially good results are obtained when using from about 10 to about 60 parts per million.

These trialkyl phosphates are conventional compounds, which may be prepared by methods well-known in the art. Good results are obtained when their acid number is less than 12. Especially good results are obtained when the phosphate has an acid number from about 2 to about 8.

The polyesters of this invention may be prepared in accordance with conventional techniques such as described above and further illustrated in U.S. Pats. 2,901,466 and 3,075,952. Suitable acids for preparing these polyesters are aliphatic, cycloaliphatic, and aromatic dicarboxylic acids. Examples of such acids include oxalic; malonic; dimethylmalonic; succinic; glutaric; adipic; 3-methyl adipic; trimethyl adipic; pimelic; 2,2-dimethylglutaric; 3,3-diethylsuccinic; azelaic; sebacic; suberic; fumaric; maleic; itaconic; 1,2-cyclopentanedicarboxylic; 1,3-cyclopentanedicarboxylic; 1,2-cyclohexanedicarboxylic; 1,3-cyclohexanedicarboxylic; 1,4 - cyclohexanedicarboxylic; 1,4-cyclohexenedicarboxylic; phthalic; terephthalic; isophthalic; 4-methylisophthalic; t-butyl isophthalic; 2,5-norbornanedicarboxylic; 2,5-norbornenedicarboxylic; 1,4-naphthalic; diphenic; 4,4'-oxydibenzoic; 4,4'-methylenedibenzoic; diglycolic; thiodipropionic; 4,4'-sulfonyldibenzoic; 2,5-naphthalenedicarboxylic; 2,6-naphthalenedicarboxylic; and 2,7-naphthalenedicarboxylic acids. It will be understood that use of the corresponding acid anhydrides, esters, and acid chlorides of these acids is included in the phrase "derived from a difunctional dicarboxylic acid." Preferred among these derivatives are the esters, examples of which include dimethyl 1,4-cyclohexanedicarboxylate; dimethyl 2,6-naphthalenedicarboxylate; dimethyl 4,4'-sulfonyldibenzoate; dimethyl isophthalate; dimethyl terephthalate; and diphenyl terephthalate. Copolyesters may be prepared using two or more of the above dicarboxylic acids or derivatives thereof.

The term "ester interchange" will be understood to include the reaction of ethylene glycol with the above-described acids or derivatives thereof.

The polyesters prepared in accordance with this invention generally have an inherent viscosity (I.V.) of at least about 0.35 (preferably at least about 0.50). Whenever the term "inherent viscosity" (I.V.) is used in this application, it will be understood to refer to viscosity determinations made at 25° C. using 0.25 gram of polymer per 100 ml. of a solvent composed of 60 percent phenol and 40 percent tetrachloroethane.

Minor amounts of additives (such as dyes, pigments, stabilizers, and fillers) may be added to enhance various properties of the final polyester.

This invention will be further illustrated by the following examples.

EXAMPLES 1 THROUGH 12

Examples 1 through 12, which relate to the preparation of poly(ethylene terephthalate), are recorded in Table I.

In each case, the polymer is prepared in the following manner: 40 parts of dimethyl terephthalate and 30 parts of ethylene glycol are placed in a flask together with 90 p.p.m. Zn from $Zn(OAc)_2 \cdot 2H_2O$ and 370 p.p.m. Sb from $Sb(OAc)_3$ (p.p.m. based on weight of final polymer). The amount of phosphorus from tris(2,2,4-trimethylpentyl)phosphate (TMPP) and acid number thereof are shown in Table I. The flasks are equipped with distillation arm and stirrer and immersed at 195° C. in a heating bath. The time required to reach 90 percent completion of the ester interchange (E.I.) is measured by the amount of methanol removed. The time required for 90 percent completion of the ester interchange varies from 27 to 65 minutes and is dependent on the amount of the TMPP used and on the acid number of the phosphate. After the ester interchange is completed, the temperature is raised over a 30 minute period from 195° C. to 275° C., and a vacuum is slowly applied. A vacuum of less than one mm. is obtained over a 15 minute interval, and the polymer is then allowed to polymerize for an additional 75 minutes. After polymerization is complete, the polymer is allowed to cool while still under vacuum, then removed and visually color graded. The color grades are given in Table I with low values indicating extremely low colored polymers and high values indicating highly colored polymers. The inherent viscosities of the polymers are also shown together with the acid numbers of the phosphate.

TABLE I

| Example No.: | Amount of TMPP, p.p.m. as P | Acid No. of TMPP | E.I. time, minutes | I.V. | Color |
|---|---|---|---|---|---|
| 1 | | | 60 | 0.76 | 10 |
| 2 | 15 | 2.0 | 60 | 0.67 | 6 |
| 3 | 30 | 4.0 | 34 | 0.78 | 6 |
| 4 | 45 | 8.0 | 53 | 0.65 | 4 |
| 5 | 60 | 16.0 | 65 | 0.64 | 2 |
| 6 | 60 | 0.0 | 48 | 0.54 | 2 |
| 7 | 45 | 2.0 | 32 | 0.75 | 4 |
| 8 | 15 | 8.0 | 39 | 0.72 | 6 |
| 9 | 15 | 16.0 | 65 | 0.62 | 6 |
| 10 | 45 | 4.0 | 45 | 0.65 | 4 |
| 11 | 15 | 4.0 | 34 | 0.63 | 6 |
| 12 | 30 | 0.0 | 45 | 0.69 | 6 |

As can be seen in Table 1, the hindered phosphate gives a marked improvement in the color of poly(ethylene terephthalate). The increased ester interchange rate is also seen in Column 4. The dependency of these rates on acid number of the phosphate used is also amply demonstrated. Examples 5 and 9 at higher acid numbers tend to slow the ester interchange. However, all examples using acid numbers between 2.0 and 8.0 tend to decrease the time to complete the ester interchange.

EXAMPLES 13 THROUGH 20

One hundred pound samples of poly(ethylene terephthalate) are produced in a batch-type reaction in which 100 parts of dimethyl terephthalate and 55 parts of ethylene glycol along with 90 p.p.m. Zn from $Zn(OAc)_2$ and 370 p.p.m. Sb from $Sb(OAc)_3$ are added together into the reactor. The amount of phosphorous from tris(2,2,4-trimethylpentyl)phosphate and acid number of the phosphate are shown in Table 2. The sterically hindered phosphate improves the ester interchange rate and gives overall reaction times which are essentially the same as the control. The color is also improved as is shown by the values listed. These color values are from crystallized, ground polymer and are taken on a Gardner color difference meter (C.D.M.), after screening the ground polymer to a given particle size range. On the color difference meter, "b" values represent blueness if (−) or yellowness if (+), and "a" values represent greenness if (−) and redness if (+). As can be seen from Table 2, both the yellowness and greenness of the polymer decrease with increasing TMPP concentrations, and the color of the polymer approaches that of a pure white standard.

TABLE 2

| Example No. | Amount of TMPP (p.p.m. as P) | Acid No. of TMPP | E. I. time, minutes | Polymerization time, minutes | Total time, minutes | I.V. | Polymer Melting Point | Color C.D.M. a | b |
|---|---|---|---|---|---|---|---|---|---|
| 13 | 0 | | 106 | 117 | 223 | .69 | 251 | −2.3 | +4.7 |
| 14 | 15 | 2.1 | 84 | 141 | 225 | .67 | 256 | −1.3 | +2.8 |
| 15 | 30 | 2.1 | 95 | 140 | 235 | .69 | 256 | −1.0 | +2.0 |
| 16 | 45 | 2.1 | 87 | 161 | 248 | .68 | 257 | −0.8 | +1.7 |
| 17 | 30 | 0 | 123 | 167 | 290 | .68 | 254 | −0.7 | +1.8 |
| 18 | 0 | | 151 | 108 | 259 | .72 | 255 | −0.7 | +4.8 |
| 19 | 30 | 4.0 | 74 | 160 | 234 | .69 | 252 | −1.0 | +1.7 |
| 20 | 45 | 8.0 | 91 | 176 | 267 | .70 | 262 | −0.8 | +1.7 |

If the polymers of Examples 18, 19, and 20 are analyzed for the amount of acetaldehyde and crotonaldehyde present, it will be seen from Table 3 that the polymer prepared without TMPP (Example 18) has more acetaldehyde and crotonaldehyde present than do those polymers (Examples 19 and 20) prepared in the presence of TMPP.

TABLE 3.—ANALYSES FOR ALDEHYDES

| Polymer of Example: | Sample weight, g. | Area, acetaldehyde, cm.$^2$ | Area, crotonaldehyde cm.$^2$ |
|---|---|---|---|
| 18 | 1.4 | 8.05 | 2.4 |
| 19 | 1.4 | 5.0 | 0.1$_4$ |
| 20 | 1.4 | 6.3 | 0.$_8$ |

Polymer samples from Examples 1 and 4 are put in a forced air oven at 200° C. After heating four hours, the polymer from Example 1 has become highly discolored. However, the polymer from Example 4 is essentially unchanged in color, thereby showing much improvement in heat stability.

While TMPP is illustrated in the foregoing examples, other sterically hindered trialkyl phosphates may be used and good results obtained. These preferably include alkyl radicals such as 2,2,4-trimethylpentyl and 2,2-dimethyloctyl.

In addition, other polyesters may be used in the above examples and good results obtained also.

As mentioned polyesters made in accordance with the invention have superior color, high melting point, and excellent thermal stability. The improved thermal stability is demonstrated by decreased rates of molecular weight breakdown and decreased coloration during processing, such as extrusion and spinning. Additionally, it has been found that film made from polyesters produced according to this invention shows a marked decrease in fogging of photographic emulsions. It has also been found that a decrease in fogging of photographic emulsions is obtained if the hindered phosphate is simply added to a convention polyester resin. Similarly, simple blends of the phosphate and resin show a marked decrease in color formation during high temperature processing, such as the melt spinning of fibers. These improved film- and fiber-forming resins can be readily obtained by melt blending the hindered trialkyl phosphate and resin.

The invention has been described in detail with particular reference to preferred embodiments thereof, but it will be understood that variations and modifications can be effected within the spirit and scope of the invention as described hereinabove and as defined in the appended claims.

We claim:

1. A highly polymeric, film and fiber forming, linear polyester consisting essentially of the reaction product of (A) an aliphatic, cycloaliphatic or aromatic difunctional dicarboxylic acid or mixture thereof and (B) ethylene glycol, said polyester containing from about 10 to about 100 parts per million, calculated as phosphorus and based on the weight of the polyester, of a sterically hindered trialkyl phosphate having the formula:

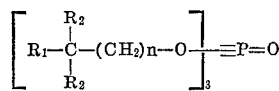

wherein $R_1$ is an alkyl group of 4 to 18 carbon atoms, each $R_2$ is an alkyl group of 1 to 4 carbon atoms, and $n$ is 0 or 1.

2. A linear polyester as defined by claim 1 wherein said sterically hindered trialkyl phosphate is tris(2,2,4-trimethylpentyl)phosphate.

3. A linear polyester as defined by claim 1 wherein said sterically hindered trialkyl phosphate is tris(2,2-dimethyloctyl)phosphate.

4. A linear polyester as defined by claim 1 and having a melting point of at least about 250° C. and an inherent viscosity of at least about 0.35 measured at about 25° C. at a concentration of about 0.25 gram of said polyester per 100 ml. of a solvent composed of 60 percent phenol and 40 percent tetrachloroethane.

5. A linear polyester as defined by claim 1 wherein said difunctional dicarboxylic acid is terephthalic acid.

6. In a process for preparing a highly polymeric, film and fiber forming, linear polyester by first effecting a reaction between (A) an aliphatic, cycloaliphatic or aromatic difunctional dicarboxylic acid or a mixture thereof and (B) ethylene glycol and then polymerizing the ester produced thereby, the improvement which comprises effecting said reaction in the presence of from about 10 to about 100 parts per million, calculated as phosphorus and based on the weight of the polyester produced, of a sterically hindered trialkyl phospate having the formula:

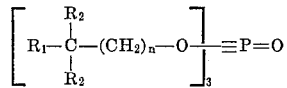

wherein $R_1$ is an alkyl group of 4 to 18 carbon atoms, each $R_2$ is an alkyl group of 1 to 4 carbon atoms, and $n$ is 0 or 1.

7. An improved process as defined by claim 6 wherein said sterically hindered trialkyl phosphate is tris(2,2,4-trimethylpentyl)phosphate.

8. An improved process as defined by claim 6 wherein said sterically hindered trialkyl phosphate is tris(2,2-dimethyloctyl)phosphate.

9. An improved process as defined by claim 6 wherein said polyester produced has a melting point of at least about 250° C. and an inherent viscosity of at least about 0.35 measured at about 25° C. at a concentration of about 0.25 gram of said polyester per 100 ml. of a solvent composed of 60 percent phenol and 40 percent tetrachloroethane.

10. An improved process as defined by claim 9 wherein said difunctional dicarboxylic acid is terephthalic acid.

References Cited

UNITED STATES PATENTS 3,404,121  10/1968  Barkey _____ 260—45.7

WILLIAM H. SHORT, Primary Examiner

L. L. LEE, Assistant Examiner

U.S. Cl. X.R.

260—45.7